(12) United States Patent
Wicks et al.

(10) Patent No.: US 10,247,089 B1
(45) Date of Patent: Apr. 2, 2019

(54) CONDENSATE PORT OF AN INTEGRAL INTAKE MANIFOLD

(71) Applicant: FORD GLOBAL TECHNOLOGIES, LLC, Dearborn, MI (US)

(72) Inventors: Christopher Donald Wicks, Allen Park, MI (US); Karen Elizabeth Maceroni, Casco, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/871,339

(22) Filed: Jan. 15, 2018

(51) Int. Cl.
*F02B 29/04* (2006.01)
*F02M 35/10* (2006.01)
*F02M 26/35* (2016.01)

(52) U.S. Cl.
CPC ......... *F02B 29/0468* (2013.01); *F02M 26/35* (2016.02); *F02M 35/10281* (2013.01); *F02M 35/10288* (2013.01)

(58) Field of Classification Search
CPC ............... F02B 29/0468; F02M 26/35; F02M 35/10281; F02M 35/10288
See application file for complete search history.

(56) References Cited

U.S. PATENT DOCUMENTS

| | | |
|---|---|---|
| 4,191,134 A | 3/1980 | Goodman |
| 4,417,547 A | 11/1983 | Goodman et al. |
| 5,199,386 A | 4/1993 | Hubbard |
| 6,422,221 B2 | 7/2002 | Pietrowski et al. |
| 6,604,506 B2 | 8/2003 | Tanaka et al. |
| 6,874,487 B2 | 4/2005 | Murphy |
| 7,032,578 B2 | 4/2006 | Liu et al. |
| 7,237,541 B2 | 7/2007 | Vanderveen et al. |
| 7,634,983 B2 | 12/2009 | Grant |
| 8,051,843 B2 | 11/2011 | Matsudaira |
| 8,181,633 B2 | 5/2012 | Ito |
| 8,567,366 B2 | 10/2013 | Reese et al. |
| 10,012,184 B2 | 7/2018 | Guidi |
| 2015/0176478 A1* | 6/2015 | Wicks ................ F02B 29/0468 60/599 |

FOREIGN PATENT DOCUMENTS

CN 202348499 U 7/2012

OTHER PUBLICATIONS

Nitrous Outlet, "5.0L Coyote Boss 302 Manifold," Oct. 31, 2014, 2 pages.
Comp. Performance Group, "Fast 102 Manifold for Cathedral Port Heads with NX Shark Direct Port Nitrous," Sep. 10, 2014, 10 pages.

* cited by examiner

*Primary Examiner* — Jacob Amick
(74) *Attorney, Agent, or Firm* — Julia Voutyras; Brooks Kushman P.C.

(57) ABSTRACT

A power train system includes a heat exchanger reservoir to collect condensate, a layered intake manifold, and integral tubing leading from the reservoir to an interior of the intake manifold via an intake manifold wall such that there is no seal between the condensate port and the manifold. The tubing splits into at least two branches transitioning into a set of wings containing a plurality of nozzles protruding into the interior.

20 Claims, 12 Drawing Sheets

US 10,247,089 B1

CONDENSATE PORT OF AN INTEGRAL INTAKE MANIFOLD

TECHNICAL FIELD

Various embodiments relate to an integral intake manifold for an internal combustion engine in a vehicle, the intake manifold featuring a condensate port, and a method of producing the same.

BACKGROUND

An intake or inlet manifold is a part of the engine that supplies the fuel/air mixture to the cylinders of the engine. The main function of the intake manifold is to evenly distribute the intake gasses to each intake port in the cylinder heads as even distribution optimizes the efficiency and performance of the engine. The design and geometry of the intake manifold influence the gas flow, turbulence, pressure drops, and other air flow phenomena inside the intake manifold. Among the gases traveling via the intake manifold may be service fluids, additive fluids, exhaust gas, condensate, and the like.

SUMMARY

According to an embodiment, a power train system is disclosed. The system includes a heat exchanger reservoir to collect condensate, a layered intake manifold, and integral tubing leading from the reservoir to an interior of the intake manifold via an intake manifold wall such that there is no seal between the condensate port and the manifold. The tubing may split into at least two branches transitioning into a set of wings containing a plurality of nozzles protruding into the interior. The wall may be located in an intake manifold plenum. The tubing may lead through a portion of the wall having the greatest thickness. The tubing may lead to a portion of the intake manifold containing a channel gradually transitioning into a runner. Each of the set of wings may partially surround a runner. Each of the plurality of nozzles may protrude into a runner cavity within the intake manifold. Each of the plurality of nozzles may include a tip having a plurality of apertures.

In an alternative embodiment, a condensate port arrangement is disclosed. The arrangement includes a series of layers defining an integrated intake manifold, and a condensate port including a tube transitioning from an exterior to an interior of the intake manifold while forming no seal between the condensate port and the manifold, the tube defining arms branching out into tubular curvatures, each having a plurality of nozzles to distribute condensate into the interior. The tube may at least partially surround the intake manifold. The tube may run perpendicular to an intake manifold wall. The plurality of nozzles may protrude through a bellmouth opening of an intake manifold runner. The tip of each of the plurality of nozzles may lay flush with an internal surface of the intake manifold. Each of the arms may transition into the tubular curvature via a symmetrical connector. The connector may be located at an extended distance from an end portion of the tubular curvature.

In a yet alternative embodiment, an engine component is disclosed. The engine component includes a stratified intake manifold and a stratified duct forming a condensate port configured to provide condensate from a heat exchanger to the engine. The duct may include an inlet located outside of the intake manifold and transitioning into an interior of the intake manifold such that there is no seal between the recirculator and the manifold, the duct splitting into wings surrounding runner flanges and containing at least two nozzles each, and the nozzles protruding via the flanges into runner cavities. Each of the nozzles may include a tip having at least one aperture. Each of the nozzles may include a plurality of apertures arranged in one or more rows. Each of the rows may include apertures with a different diameter. At least one of the nozzles may define a plurality of apertures configured to spray the condensate. The nozzles may protrude via the flanges in a direction towards runner outlets.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Reference is being made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Figure 1:
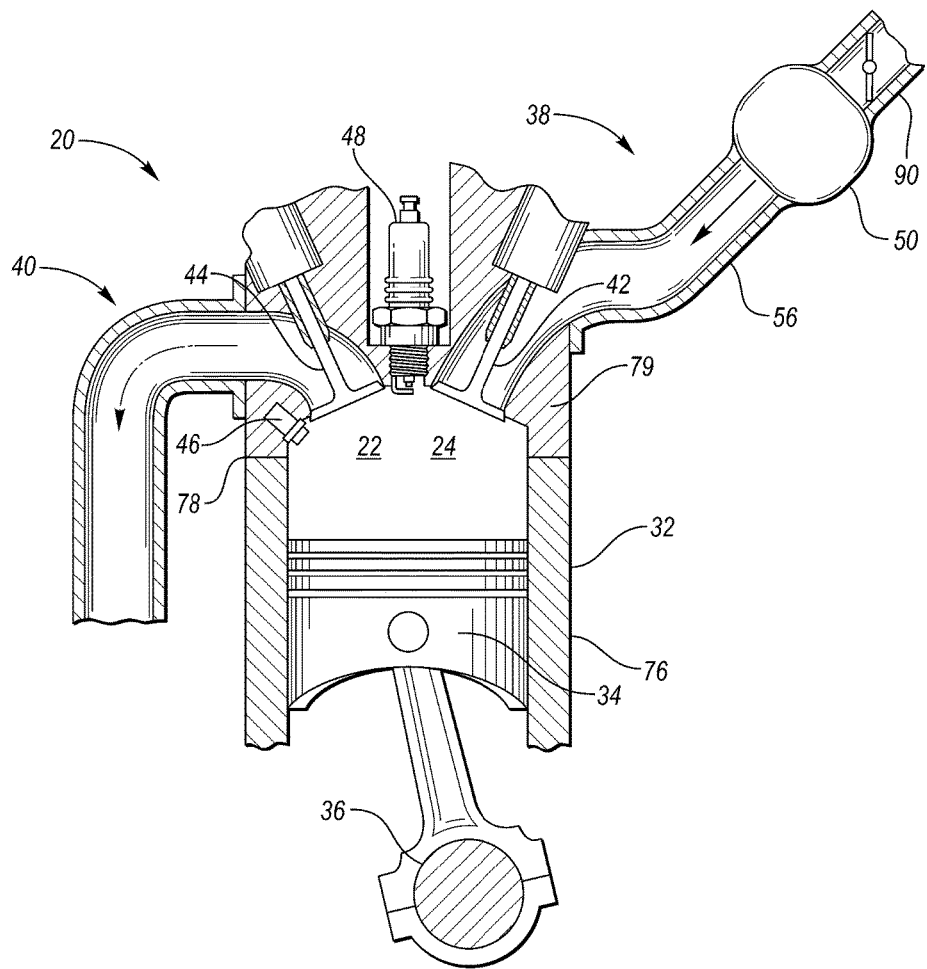
FIG. 1 illustrates a schematic of a non-limiting example of an internal combustion engine capable of employing various embodiments of the present disclosure.

Geometry, orientation, and design of an intake manifold has direct impact on the internal combustion engine efficiency. FIG. 1 illustrates a schematic non-limiting example of an internal combustion engine 20. The engine 20 has a plurality of cylinders 22, one of which is illustrated. The engine 20 may have any number of cylinders 22, including three, four, six, eight, or another number. The cylinders may be positioned in various configurations in the engine, for example, as a V-engine, an inline engine, or another arrangement.

The example engine 20 has a combustion chamber 24 associated with each cylinder 22. The cylinder 22 is formed by cylinder walls 32 and piston 34. The piston 34 is connected to a crankshaft 36. The combustion chamber 24 is in fluid communication with an example intake manifold 38 and the exhaust manifold 40. An intake valve 42 controls flow from the intake manifold 38 into the combustion chamber 24. An exhaust valve 44 controls flow from the combustion chamber 24 to the exhaust manifold 40. The intake and exhaust valves 42, 44 may be operated in various ways as is known in the art to control the engine operation.

A fuel injector 46 delivers fuel from a fuel system directly into the combustion chamber 24 such that the engine is a direct injection engine. A low pressure or high pressure fuel injection system may be used with the engine 20, or a port injection system may be used in other examples. An ignition system includes a spark plug 48 that is controlled to provide energy in the form of a spark to ignite a fuel air mixture in the combustion chamber 24. In other embodiments, other fuel delivery systems and ignition systems or techniques may be used, including compression ignition.

The engine 20 includes a controller and various sensors configured to provide signals to the controller for use in controlling the air and fuel delivery to the engine, the ignition timing, the power and torque output from the engine, and the like. Engine sensors may include, but are not limited to, an oxygen sensor in the exhaust manifold 40, an engine coolant temperature, an accelerator pedal position sensor, an engine manifold pressure (MAP) sensor, an engine position sensor for crankshaft position, an air mass sensor in the intake manifold 38, a throttle position sensor, and the like.

In some embodiments, the engine 20 may be used as the sole prime mover in a vehicle, such as a conventional vehicle, or a stop-start vehicle. In other embodiments, the engine may be used in a hybrid vehicle where an additional prime mover, such as an electric machine, is available to provide additional power to propel the vehicle.

Each cylinder 22 may operate under a four-stroke cycle including an intake stroke, a compression stroke, an ignition stroke, and an exhaust stroke. In other embodiments, the engine may operate with a two-stroke cycle. During the intake stroke, the intake valve 42 opens and the exhaust valve 44 closes while the piston 34 moves from the top of the cylinder 22 to the bottom of the cylinder 22 to introduce air from the intake manifold 38 to the combustion chamber 24. The piston 34 position at the top of the cylinder 22 is generally known as top dead center (TDC). The piston 34 position at the bottom of the cylinder 22 is generally known as bottom dead center (BDC).

During the compression stroke, the intake and exhaust valves 42, 44 are closed. The piston 34 moves from the bottom towards the top of the cylinder 22 to compress the air within the combustion chamber 24.

Fuel is then introduced into the combustion chamber 24 and ignited. In the engine 20 shown, the fuel is injected into the chamber 24 and is then ignited using spark plug 48. In other examples, the fuel may be ignited using compression ignition.

During the expansion stroke, the ignited fuel air mixture in the combustion chamber 24 expands, thereby causing the piston 34 to move from the top of the cylinder 22 to the bottom of the cylinder 22. The movement of the piston 34 causes a corresponding movement in crankshaft 36 and provides for a mechanical torque output from the engine 20.

During the exhaust stroke, the intake valve 42 remains closed, and the exhaust valve 44 opens. The piston 34 moves from the bottom of the cylinder to the top of the cylinder 22 to remove the exhaust gases and combustion products from the combustion chamber 24 by reducing the volume of the chamber 24. The exhaust gases flow from the combustion cylinder 22 to the exhaust manifold 40 and to an aftertreatment system such as a catalytic converter.

The intake and exhaust valve 42, 44 positions and timing, as well as the fuel injection timing and ignition timing may be varied for the various engine strokes.

The engine 20 includes a cooling system to remove heat from the engine 20, and may be integrated into the engine 20 as a cooling jacket containing water or another coolant.

A head gasket 78 may be interposed between the cylinder block 76 and the cylinder head 79 to seal the cylinders 22.

The depicted non-limiting example intake manifold 38 leading to the engine 20 includes a plenum housing 50 distributing intake gases to runners 56. The runners 56 provide the intake gases, including ambient air, exhaust gases from exhaust gas recirculation, the like, or a combination thereof, to the intake valves 42. A throttle valve 90 is provided to control the flow of intake gases to the plenum housing 50. The throttle valve 90 may be connected to an electronic throttle body for electronic control of the valve position. The intake manifold 38 may be connected to an exhaust gas recirculation (EGR) system, a canister purge valve (CPV) and fuel system, a positive crankcase ventilation (PCV) system, a brake booster system, the like, or a combination thereof. An air filter (not shown) may be provided upstream of the throttle valve 90.

Figure 2:
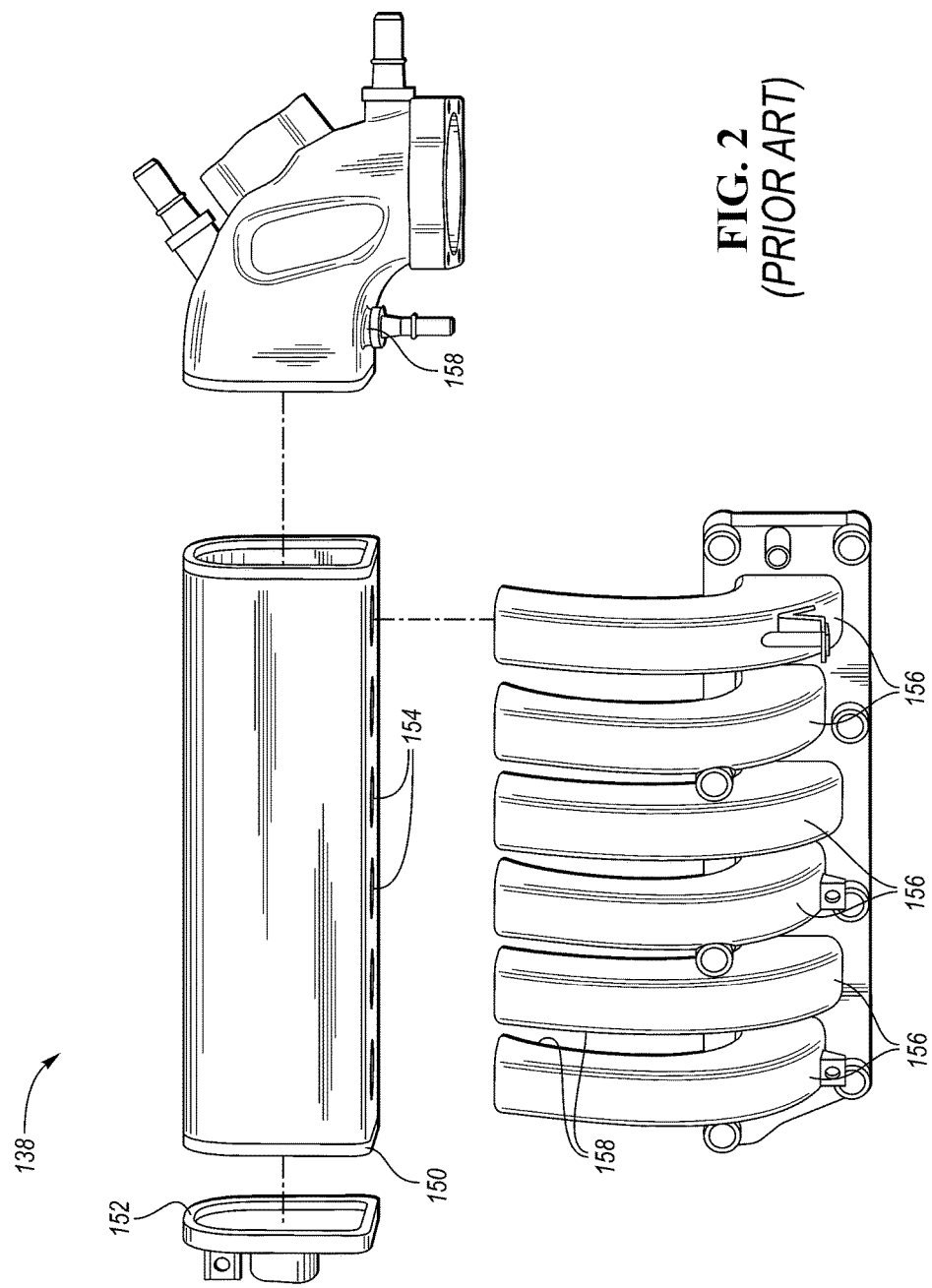
FIG. 2 illustrates an exploded view of an example prior art intake manifold.

Typically, as is shown in FIG. 2, an intake manifold 138 is manufactured in separate parts which are subsequently assembled together. For example, FIG. 2 shows an exploded view of an intake manifold system 138 according to an embodiment for use with the engine of FIG. 1. The intake manifold 138 is a modular system that allows for various separate components of the intake manifold to be positioned and assembled variably to form the manifold 138. The assembly requires manufacture of separate parts such that the intake manifold 138 may be assembled in multiple configurations based on the engine position and vehicle packaging considerations. The individual separate parts include the plenum body 150, the end plate 152 to enclose the interior volume of the plenum body 150, apertures 154 of the plenum body 150 to receive runners 156, and a throttle body connector 158.

Figure 3:
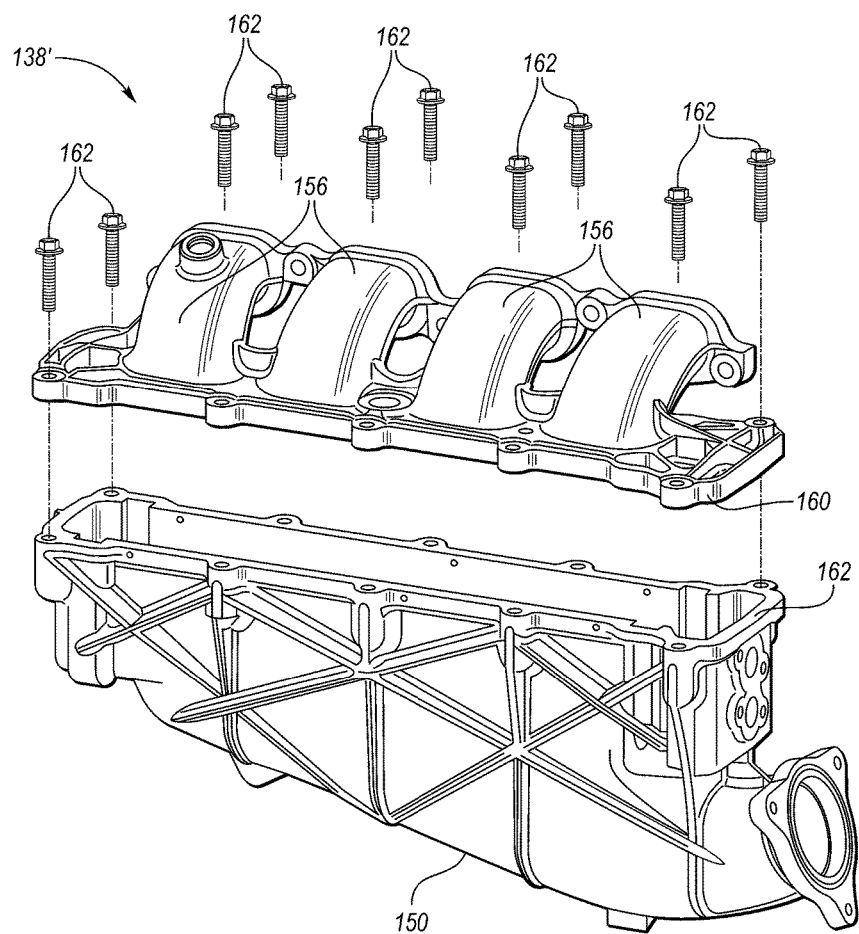
FIG. 3 illustrates an exploded view of an alternative prior art example intake manifold.

Yet, other intake manifolds with just one installation position within the engine, such as an intake manifold 138' depicted in FIG. 3, are typically manufactured in several pieces or parts and subsequently assembled and secured with fasteners, adhesives, welds, or a combination thereof. FIG. 3 depicts an intake manifold 138' having several discreet parts including a plenum 150 and a separate piece forming a plurality of runners 156 and a flange 160, attachable to a top end 162 of the plenum 150 with fasteners 162. To further strengthen the plenum 150, ribs 164 are typically added on the exterior portion of the plenum 150.

Yet, assembly of various parts to form a typical intake manifold is quite complex and time consuming. In the interest of increasing fuel efficiency, some of the parts may be made from light-weight materials such as composites and plastics. This may result in a number of connecting parts made from different materials which typically presents a challenge, especially if the bond is to be leak-proof. Assembly is time consuming and adds to cycle time. Moreover, anytime bonding of at least two components is required, necessary control checks are vital to ensure that the bond is provided correctly. Such checks are expensive and add to cycle time.

Furthermore, traditional manufacturing methods, and the need to assemble individual parts together, present limitations with respect to the shape of the individual parts which may be manufactured. Thus, overall efficiency of the intake manifold may be limited as the shape ideal from an air-flow perspective may not be practical to manufacture due to cost, assembly, and time perspective.

Thus, it would be desirable to provide an intake manifold with reduced complexity of manufacturing, improved efficiency, and reduced time and cost of the intake manifold production.

In one or more embodiments, an integral intake manifold 238 overcoming one or more disadvantages of the prior art listed above is disclosed. The integral intake manifold 238, depicted, for example, in FIG. 4, includes a plenum or plenum housing 250 having a gas inlet 264 gradually extending into a plurality of channels 256. The plenum 250 is hollow and provides an internal volume for the intake gases to be distributed via the channels 256 to the engine. The plenum 250 may be sized and shaped to be at a partial vacuum during engine operation. The intake gas(es) may include fuel, ambient air, EGR gas, or a combination thereof.

In one non-limiting example, the plenum 250 may include additional features such as a sensor mount for a sensor such as an intake gas temperature sensor, a pressure sensor, the like, or a combination thereof. The plenum 250 may include an attachment feature 252 for use in connecting or supporting the intake manifold 238 to the engine, the vehicle, or both. The attachment feature 252 may include a flange, an aperture, or the like such that the unitary intake manifold 238 may be secured to the engine, the vehicle, or both.

While in the prior art, the plenum is typically a "log" style plenum body having a width of the internal cavity and distance between the longest sides quite regular, the disclosed plenum 250 has a varying shape defined by a plurality of channels 256. The plenum 250 includes partial walls 272 that form the channels 256 radiating from the common gas inlet 264. The partial walls 272 form an endoskeletal structure configured to support the intake manifold 250. The partial walls 272 divide the channels 256 from one another. The partial walls 272 may protrude into the cavity of the plenum from the opposing faces of the plenum 250, but do span from one face of the plenum to the other face and do not connect the opposing faces of the plenum 250. Alternatively, the partial walls 272 may be formed on just one face of the plenum 250. The plenum 250 thus does not feature any ribs on the outside as the endoskeleton, formed by the partial walls 272, strengthens the plenum 250.

The partial walls 272 may have a greater thickness/height than the thickness of the remaining portions of the plenum 250. The partial walls 272 may have a varying height such that at least one partial walls extend further into the cavity of the plenum 250 than at least one other partial wall 272. Height of the partial walls 272 is discussed below. Alternatively, all the partial walls 272 may have the same height within the cavity of the plenum 250.

The channels 256, divided by the partial walls 272, may be shaped in various ways. For example, the channels 256 may be straight, curved, or both. The channels 256 may have various lengths, based on the engine design. The channels 256 may be tuned to take advantage of the Helmholtz resonance effect. Each channel 256 may be shaped differently, have different geometry, to maximize air flow into the engine. For example, at least one channel 256 may have different dimensions than the remaining channels 256. The dimensions may include length, angle of curvature, width. The dimensions may differ within the length of a channel 256. For example, the channel 256 may widen in the direction from the air inlet 264 towards an opening 254.

Figure 5:
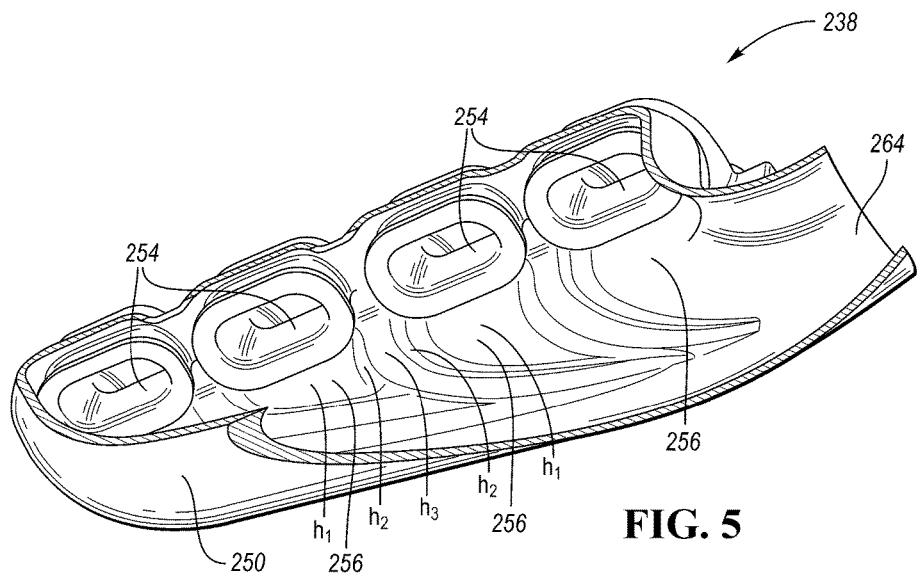
FIG. 5 shows a cross-sectional view of the unitary intake manifold of FIG. 4 along the line 5-5.
Figure 6:
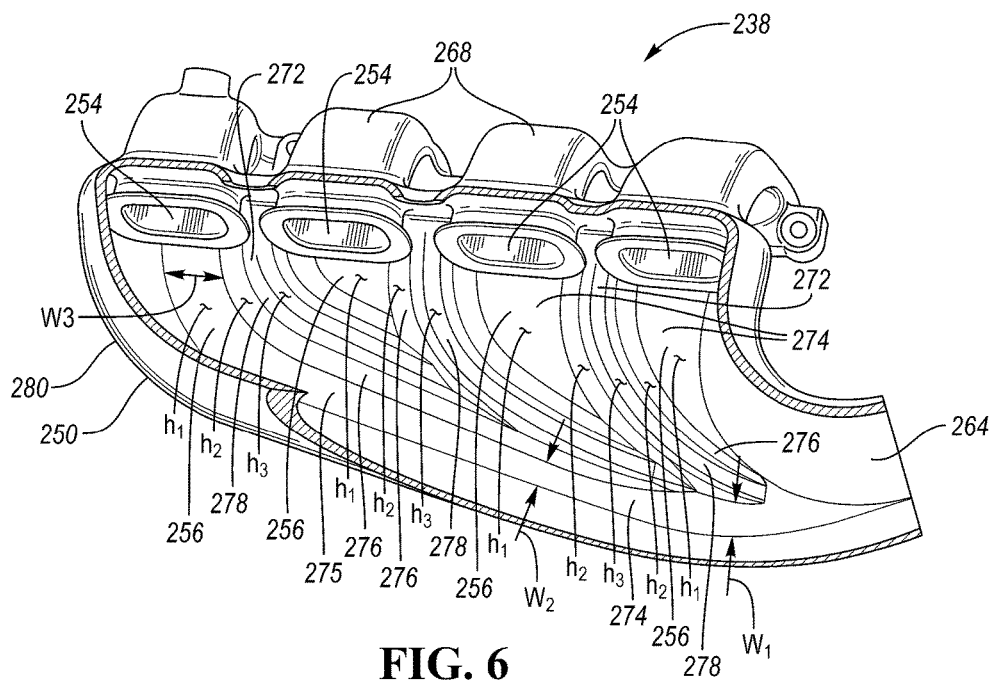
FIG. 6 shows an alternative cross-sectional view of the unitary intake manifold of FIG. 4 along the line 6-6.

As FIGS. 5 and 6 show, the gas inlet 264 forms a first end of the channels 256. The channels 256 have a second end 266 formed by an opening or aperture 254. The channels 256 may gradually transition into runners 268 via the opening 254. The channels 256 transition into the runners such that there is no seal between the plenum 250 and the runners 268.

The aperture 254 is positioned at the opposite end of each channel 256 than the gas inlet 264. The aperture 254 may be arranged perpendicular to the influx of intake gasses via the gas inlet 264. The opening 254 may be a bell mouth opening. The bell mouth opening 254 is a tapered opening where the taper may resemble a shape of a bell. The bell mouth opening 254 may be an expanding or reducing opening. The angle of the opening 254 may be tapered at about 30-60°, or at about 45°. The opening 254 gradually extends or leads into a plurality of runners 268. The transition from the channels 256 into the openings 254 and into the runners 268 may be smooth, without interruptions in airflow, a gradual transition of curvatures of the same material. The transition of the channels 256 to the opening may include a flange 282 and a notch 255, examples of which are depicted in FIG. 7.

Figure 7:
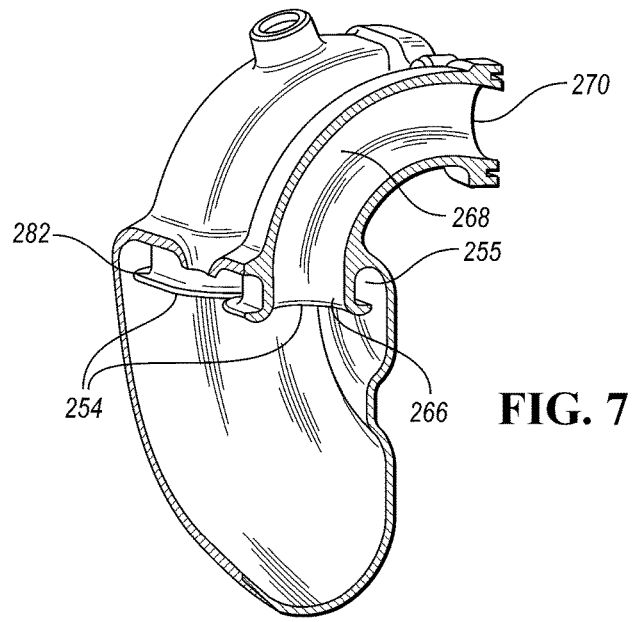
FIG. 7 show a yet an alternative cross-sectional view of the unitary intake manifold of FIG. 4 along the line 7-7.

The runners or ducts 268, cross-section of which is depicted in FIG. 7, form a convergent inlet airway directing the intake gas into the inlet of the engine or into an intake port of the cylinder head. The runners 268 may have the same or different dimensions, shape, or both. The runner 268 may have a circular, oval, or rectangular cross-section. The runner 268 may have the same cross-section as the opening 254. The runner 268 may get smaller as the gas flows into the engine via an outlet 270. The runner 268 may have uniform geometry, width, or both throughout its length. Incorporation of the bell mouth opening 254 leading to the runners 268 may increase efficiency of air flow via the intake manifold 238 to the engine.

The cross-sectional area of the bell mouth opening 254 may be larger than that of the runner 268. The cross-sectional area of the bell mouth opening 254 may be about double that of the runner 268 area. The cross-sectional area of the bell mouth opening 254 may be such that the air velocity entering the bell mouth opening is low to reduce noise, turbulence, pressure drop, and the like, and gradually increases to the desired design velocity of the runner 268.

The cross section of the opening 254 may be rectangular, square, circular, oval, or the like. The opening 254 may have a flange 282 around at least a portion of its circumference. The opening 254 may have the same, smaller, or larger diameter than the diameter of the gas inlet 264.

As can be further seen in FIG. 6 with respect to the channels 256, individual channels 256 are divided from one another. The division may be provided by one or more areas forming partial walls 272. The partial walls 272 may form raised portions extending towards the interior of the plenum 250, but not connecting opposing faces of the plenum 250. The partial walls 272 may form lateral portions of each channel 256. The height of the partial walls 272 may differ. The partial walls 272 may have peaks 278 forming the highest portions of the dividing areas 272.

The channels 256 thus contain the shallowest portion 274 having height $h_1$, the partial walls featuring a middle portion 276 having height $h_2$, and a peak 278 having height $h_3$, $h_1 > h_2 > h_3$. Additional raised portions of the partial walls 272 with additional heights different from $h_1$, $h_2$, $h_3$ are contemplated.

The shallowest portion 274 of each channel 256 may have a different shape and area than in the remaining channels 256. For example, the channel 256 leading to the opening 254 most distant from the air inlet 264 may include the shallowest portion 274 arranged as an expansion area 275. The expansion area 275 may be defined by a partial wall 272 between adjacent channels 256 and an outer side 280 of the plenum 250. Another expansion area may be included in a channel 256 adjacent to the gas inlet 264 defined by a partial wall 272 and an outer side of the plenum 280. The expansion area 275 may have a width which increases in the direction from the air inlet 264 towards the mouth opening 254. The expansion area 275 may expand the entire length between the air inlet 264 and the opening 254. The width of the expansion area 275 may differ throughout its length to accommodate the most optimized airflow patterns. The varying width of the expansion area allows for even distribution of the intake gas. For example, $w_3 > w_1 > w_2$.

In contrast to the expansion area 275 of the outer-most channel 256 and/or the channel adjacent to the gas inlet 264, the shallowest portion 274 of the remaining channels 256 may not extend from the gas inlet 264, but be confined within the middle portions 276 and peaks 278 of the partial walls 272. Thus, the inlet gasses entering the plenum 250 via the gas inlet 264 encounter predominantly the open expansion area 275. Specifically, the expansion area 275 in the channel 256 adjacent to the gas inlet 264 allows to direct gas into the channel 256 which is typically hard to supply gas with in the prior art designs. The purpose of this design thus allows even distribution of the intake gasses within the entire plenum 250 and intake manifold 238 such that the gasses flow from the gas inlet 264 via the channels 256 towards the opening 254, via the runners 268 and the outlet 270 evenly. Even distribution optimizes the efficiency and performance of the engine.

Figure 4:
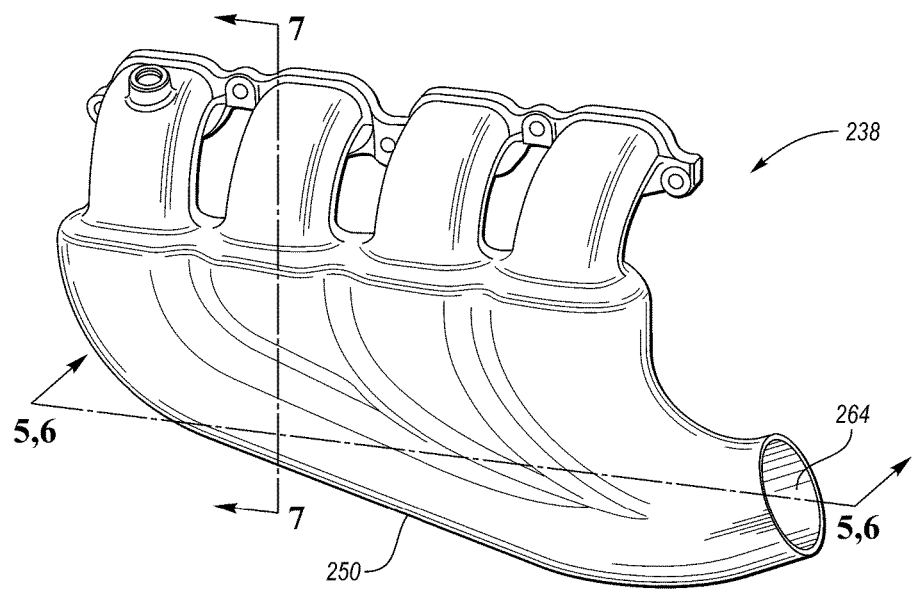
FIG. 4 illustrates a perspective view of a non-limiting example of a unitary intake manifold according to one or more embodiments.

As depicted in FIGS. 4-6, the intake manifold 238 is formed as a unitary, integral piece. The unitary piece includes the plenum 250 with the channels 256, gradually transitioning into runners 268. The unitary intake manifold 238 thus presents an article having a surface with smooth contours throughout the article, providing smooth transitions from the gas inlet 264 to the channel outlets 270, resulting in an even distribution of the intake gasses to the engine, optimal degree of turbulence supporting atomization, and minimizing pressure drops. Unitary means that the entire intake manifold 238 is formed as one piece such that the individually described portions mentioned above are formed as integral portions of the intake manifold 238 and not as separate parts, later assembled into an intake manifold. The unitary intake manifold 238 thus requires no seals. For example, there is no seal between the plenum 250 and the runners 268.

The inner surface of the unitary intake manifold 238 may be smooth, textured, rough, or a combination thereof. For example, at least one portion of the inner surface may be textured to induce a desired degree of turbulence within the intake manifold 238.

The wall thickness of the intake manifold may be reduced in comparison with the prior art intake manifolds. For example, while the typical intake manifold has a wall thickness of about 3.5 to 4.5 mm, and stiffening ribs on the exterior part of the plenum, the unitary intake manifold 238 disclosed herein may have a wall thickness of about 2 mm. Stiffening ribs are not necessary due to presence of the partial walls 272 configured to support the intake manifold 238.

Figure 8:
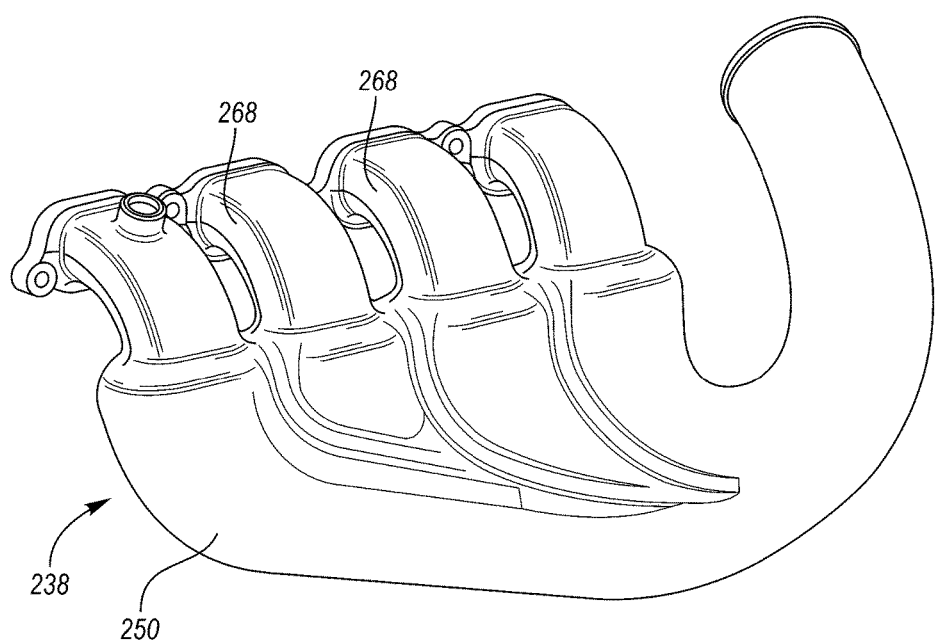
FIG. 8 shows an alternative embodiment of the unitary intake manifold including a non-limiting example of a gooseneck disclosed herein.

In another embodiment, depicted in FIG. 8, the unitary intake manifold 238 also includes a gas inlet channel, duct, or gooseneck conduit 284. The gooseneck conduit 284 extends outwardly from the gas inlet 264. The gooseneck conduit 284 gradually transitions into the channels 256 such that there is no seal between the plenum 250 and the gooseneck conduit 284.

The gooseneck conduit 284 may have the same diameter as the gas inlet 264. The gooseneck conduit 284 may extend, curve, or both from the plenum 250 in the same or similar general direction as the runners 268. The gooseneck conduit 284 may have uniform dimensions, geometry, or both throughout its length. The gooseneck conduit 284 may have a variety of shapes. For example, the gooseneck conduit 284 may be formed as a cylindrical tube. The gooseneck conduit 284 may form an elbow-shaped portion. The gooseneck conduit 284 may be straight or curved. The gooseneck conduit 284 may be hollow. The gooseneck conduit 284 may be partially perforated, perforated along its entire length, or free of perforations. The gooseneck conduit 284 may have protrusions, ridges, or other texture inside to guide gas flow in an optimal manner from a first end 285, defining a port, opening, or aperture, to the gas inlet 264 forming the second end. The gooseneck conduit 284 has an inner or interior portion and an exterior portion.

The gooseneck conduit 284 may also define various ports, mounts, sensors, apparatuses, or a combination thereof for connection to the engine, vehicle systems, or both which may be arranged in various manners. For example, the gooseneck conduit 284 may have a brake booster port, an exhaust gas recirculation (EGR) apparatus, a connection port or mount for positive crankcase ventilation (PCV) apparatus, a connection port or mount for a canister purge valve (CPV) or system, a throttle body, the like, or a combination thereof. The arrangement of the ports, mounts, sensors, apparatuses, may be based on their size and packaging considerations, may be on the interior portion, exterior portion of the gooseneck conduit 284, or both. The gooseneck 284 may further include additional features such as a throttle body to provide a restriction and/or a flow channel for the intake gasses from the throttle body 286 to the plenum 250. The gooseneck 284 may include a fuel injector 292, a PCV apparatus 300, the EGR apparatus 316, or a combination thereof.

In an alternative embodiment, at least some of the features named above, or other features, may be located in different portions of the intake manifold 238. For example, the intake manifold 238 may include an additive fluid delivery port 400. The additive fluid may be any service fluid such as a fluid capable of cleaning a portion of the engine or a fluid capable of boosting the engine performance. Example fluids may include nitrous oxide, a fuel injector cleaner, engine degreaser, crankcase conditioner, a general purpose cleaner, carburetor cleaner, the like, or a combination thereof. Other fluids such as an exhaust gas or condensate are contemplated.

Figure 9A:
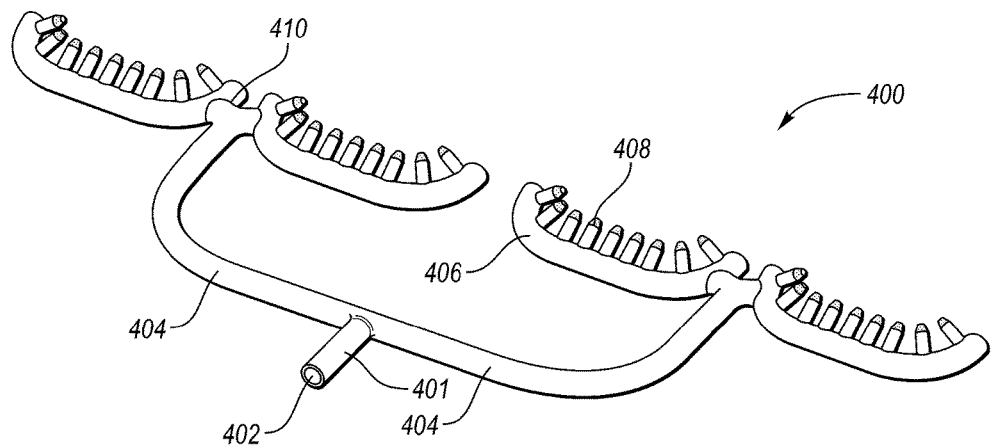
FIGS. 9A-9C illustrate various embodiments of the fluid distribution port integral with the intake manifold of FIGS. 4-8.
Figure 9B:
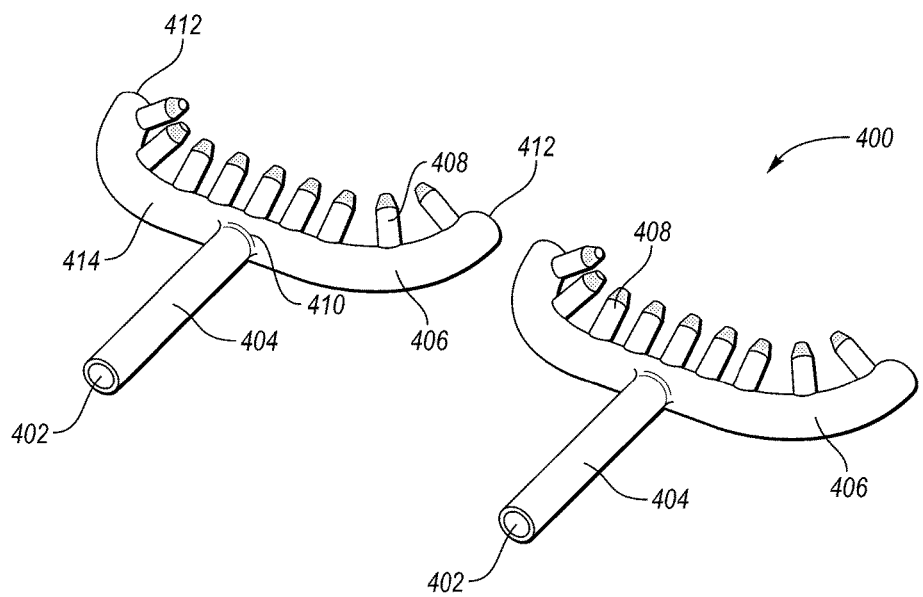
Figure 9C:
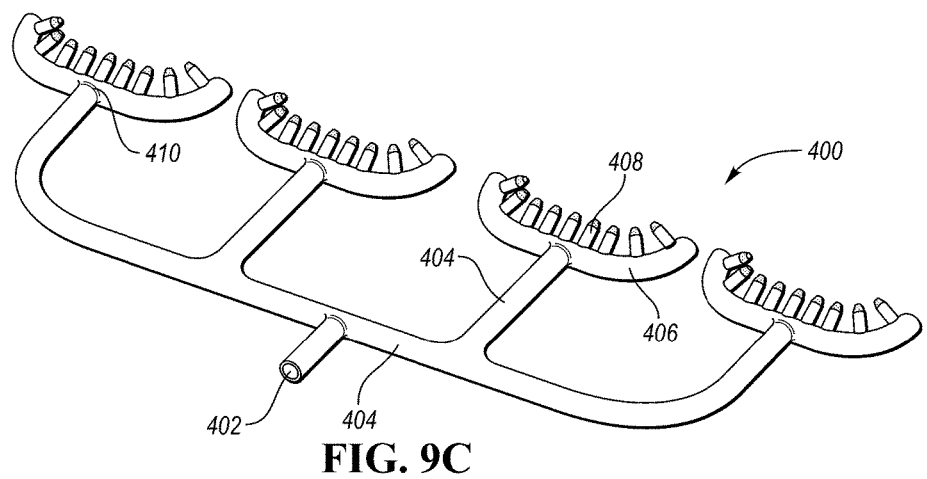

As is depicted in FIGS. 9A-9C, the additive fluid delivery port or port 400 may include at least one duct, conduit, tubing, or tube 401 having an inlet 402. The inlet may be tubular with a cross-section which is symmetrical, asymmetrical, regular, irregular, circular, oval, square, rectangular, triangular, oblong, or the like. The inlet 402 may be located outside of the intake manifold 238. For example, the inlet 402 may be located adjacent to an exterior of the intake manifold 238, run alongside the exterior wall of the intake manifold 238, and/or run perpendicular to the intake manifold exterior wall. The tube 401 with the inlet 402 may be also an integral part of the intake manifold 238 body such that a portion of the tube 401 is an integral part of the intake manifold body, is closely adjacent to the body, or forms a portion of the intake manifold body.

The port 400 may include one or more branches or arms 404 extending into an interior of the intake manifold 238 such that there is no seal between the additive fluid delivery port 400 and the manifold 238. In other words, the port 400 and the intake manifold 238 are formed as integral parts, as a stratified unitary piece such that the port 400 seamlessly transitions into the intake manifold 238. The additive fluid delivery port 400 may include 2, 3, 4, 5, 6, 8, 10, or more branches 404. In at least one embodiment, a portion of the branches 404 may be located on the exterior of the intake manifold 238 and another portion of the branches 404 may be located on the interior of the intake manifold 238. In an alternative embodiment, only the inlet 402 may be located on the outside of the intake manifold 238 such that the tubing 401 enters the interior of the intake manifold 238 before it splits into the two or more branches 404.

FIG. 9A illustrates the tubing 401 splitting into two branches 404. In at least one alternative embodiment, depicted in FIG. 9B, the inlet 402 may transition into a single branch 404, which is independent of additional tubing 401, inlets 402, and branches 404. Alternatively still, as FIG. 9C shows, a single inlet 402 may provide the fluid to four individual, but interconnected branches 404.

Figure 10A:
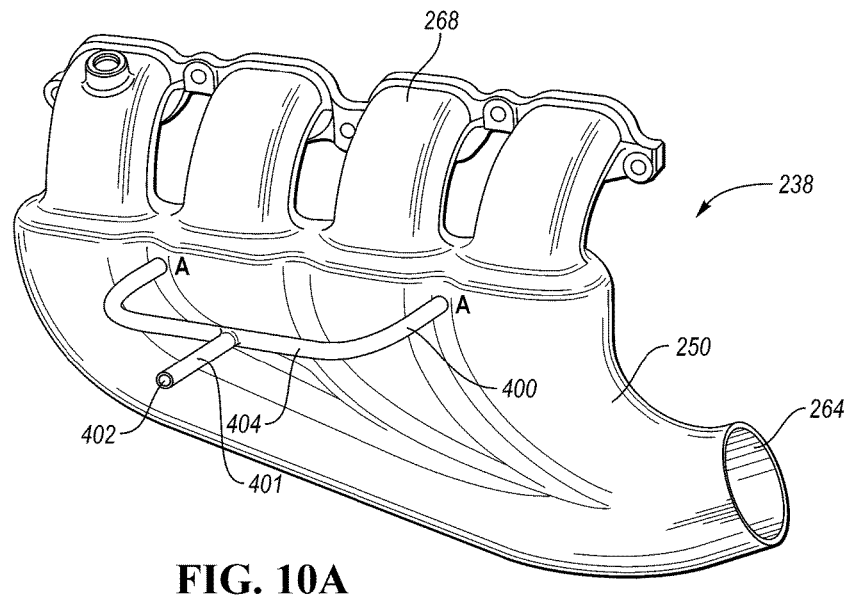
FIG. 10A shows a perspective view of the integral intake manifold of FIGS. 4-8 and the fluid distribution port with an example location for point of entry of the port 400 into the body of the intake manifold.
Figure 10B:
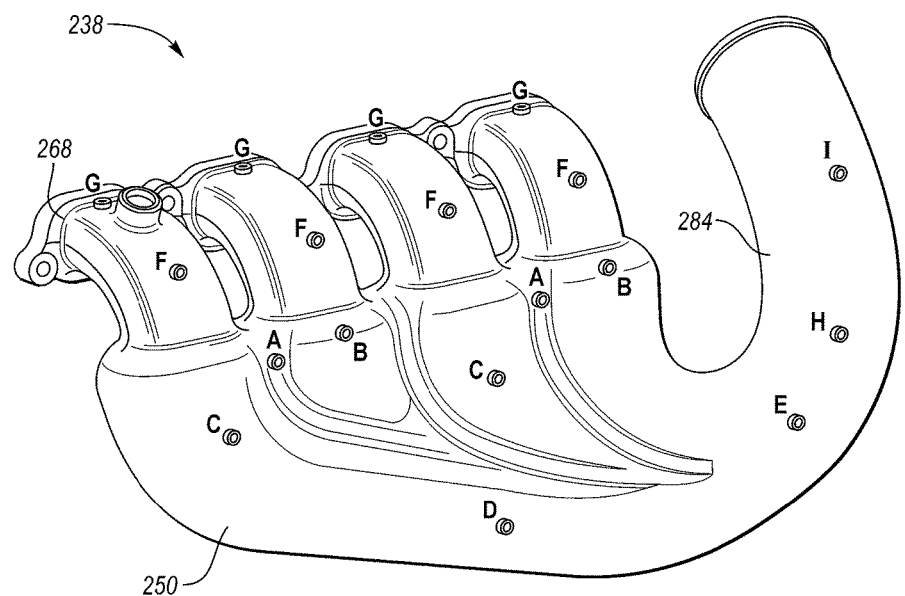
FIG. 10B shows alternative example locations for the point of entry of the fluid distribution port into the body of the intake manifold.

As can be seen in FIGS. 10A and 10B, the point of entry of the port tubing 401 leading from the inlet 402 or the branches 404 may be at various locations. Exemplary non-limiting locations are marked with letters A-I, corresponding to the partial walls (A), the channels (B, C, D), adjacent or in close proximity to the opening 264 to the gooseneck 284 (E), in the runners (F), adjacent or in close proximity to the outlet 270 (G), or in the gooseneck (H, I). Additionally, the port 400 may be located on one or more sides of the intake manifold 238. For example, a port 400 may be included on opposing faces of the intake manifold 238. The ports 400 may be included at the same or different height on different portions of the intake manifold 238. More than one port 400 may be located on a single side of the intake manifold 238. For example, a single intake manifold may include several ports 400 to deliver more fluid of one type and/or more types of fluids described above. For example, a single intake manifold 238 may include at least one EGR port, a condensate port, an additive fluid port, the like, or a combination thereof, each placed at the locations A-H depicted in FIGS. 10A and 10B, or at an alternative location of the intake manifold 238.

Thus, the individual branches 404 may enter the interior of the intake manifold 404 via the point of entry at a variety of locations. For example, the branches 404 may be located in the intake manifold plenum 250 (A-E), in one or more channels 256 (B, C, D), in one or more of the partial walls or areas dividing the individual channels 272 (A), adjacent to the gas inlet 264 (E), in one or more runners 268 (F, G), in the gooseneck 284 (H, I), or the like. For example, the branches 404 may enter the plenum 250 within the partial wall 272 such that the entry is via the thickest portion of the plenum 250, which may contribute to structural stability of the plenum 250 with the port(s) 400. Alternatively, the branches 404 may enter the intake manifold 238 in the vicinity of the outlet 270 designed to connect to an intake port of a cylinder head. Alternatively still, the branches 404 may enter the intake manifold 238 adjacent to the gradual transition of the channels 256 to the runners 268, the flange 282, the aperture 254.

The amount and placement of the branches 404 depends on the specific design of the intake manifold. For example, a single branch 404 may be dedicated to each runner 268. In an alternative embodiment, depicted in FIG. 11, a branch supplies the fluid to two wings 406, each surrounding a runner 268. In another example, a single branch 404 may be connected to each wing 406 via a connector 410, depicted in FIGS. 9A-9C. The connection may be a gradual transition of the branch 404 into a wing 406. The connection may be located at an end portion 412, central portion 414 of the wing 406, or in a curved portion of the wing 406.

Figure 11:
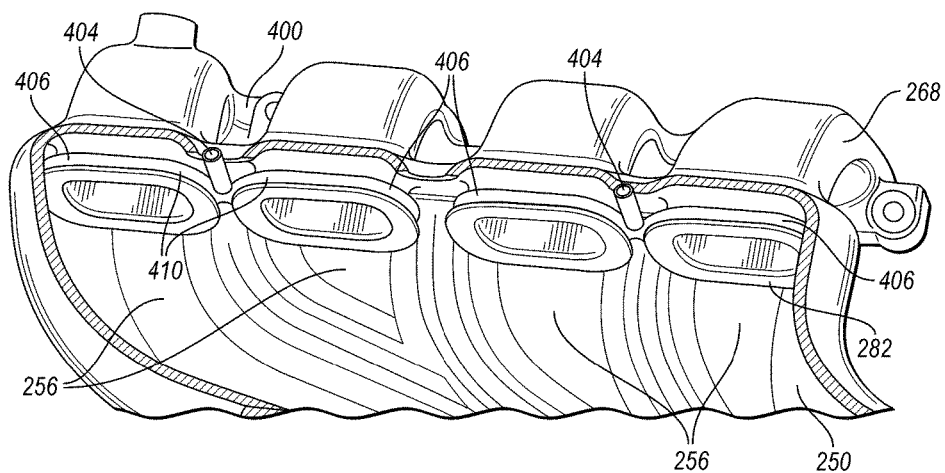
FIG. 11 a cross-sectional view of the unitary intake manifold of FIG. 4 along the line 5-5 with the addition of the branches and wings of the fluid distribution port.

In at least one embodiment, example of which is illustrated in FIG. 11, each branch 404 may further extend into a set of wings or sub-branches 406. The extension of the branch 404 into the set of wings 406 may form a bifurcated tube. The set of wings may include two adjacent wings 406. The division of the branch 404 into a set of wings 406 may be symmetrical such that division may include a curved connector 410 from the branch 404 into each wing 406, one connector 410 curved to the right at an angle and a second connector 410 curved to the left at an angle. The angle may be 20, 30, 40, 45, 50, 60, 70, 75, 80, 90, or more degrees with respect to the direction of the branch 404. The connection may increase in diameter as the connection transitions into the wing 406.

The connector 410 gradually transitions from the branch 404 into the wing or sub-branch 406. The transition may be located at an end portion 412, central portion 414 of the wing 406, or in a curved portion of the wing 406. It may be beneficial to place the connector 410 further away from an end portion 412 of the wing 406 to provide for an even flow of the fluid within the wings 406.

Each wing 406 may be symmetrical or asymmetrical. For example, each wing 406 may form a curvature, even or uneven at each end 412. The wings 406 may be tubular or hollow or form a tubular or hollow member or a duct to allow flow of the fluid inside. The tubular curvature may enable even flow of the fluid from the branches 404 via the wings 406 to a destination such as a nozzle 408 from which the fluid enters the internal cavity of the intake manifold 238.

Each wing 406 may form a half-ring, half-oval, quarter ring, quarter oval, a ¾ ring, a ¾ oval, an entire ring or entire oval, a torus, a rounded rectangle, a rounded square. Other lengths of the wing 406 are contemplated. In at least one embodiment, the wing 406 may feature corners which are not curved or oblong such that the shape of the wing 406 may be square or rectangular with sharp corners. Yet with such design, an optimal even flow of fluid may be more difficult to achieve.

Figure 12A:
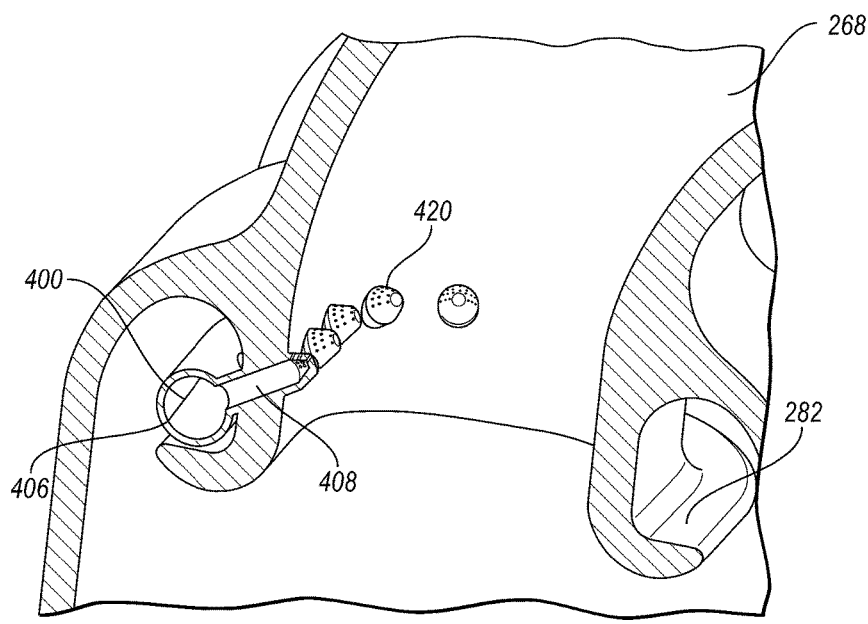
FIGS. 12A and 12B show exemplary placement of the wings of the fluid distribution port in the intake manifold, specifically surrounding at least a portion of the intake manifold where the channels transition into runners.

The wings 406 may at least partially surround a portion of an intake manifold 238, as is depicted in FIG. 12A. For example, the wings 406 may partially or fully surround the intake manifold at a location where the channels 256 transition into the runners 268. Such location may be at a flange 282. The wings 406 may rest on the flange 282 or gradually transition into the flange 282 such that a portion of the wing 406 forms the flange 282. In an alternative embodiment, depicted in FIG. 12B, the wings may fully or entirely surround a portion of the intake manifold 238 such that an entire circumference or length of the portion is surrounded by the wings 406. In such case, nozzles 408 present in the wings 406 may be provided in a portion of the wing or in the entire length of the wing 406.

The port 400 may include one or more nozzles 408. The amount of nozzles may differ, depending on the needs of a specific application. The nozzles may extend from the branch 404 or from the wing 406. For example, each branch may include more than one nozzle 408. Alternatively, each wing may include more than one nozzle 408. In a non-limiting example, a wing may include 1, 2, 3, 4, 5, 6, 7, 8, 9, 10, or more nozzles. The nozzles 408 may be the same or different in each wing 406, branch 404, port 400.

Figure 12B:
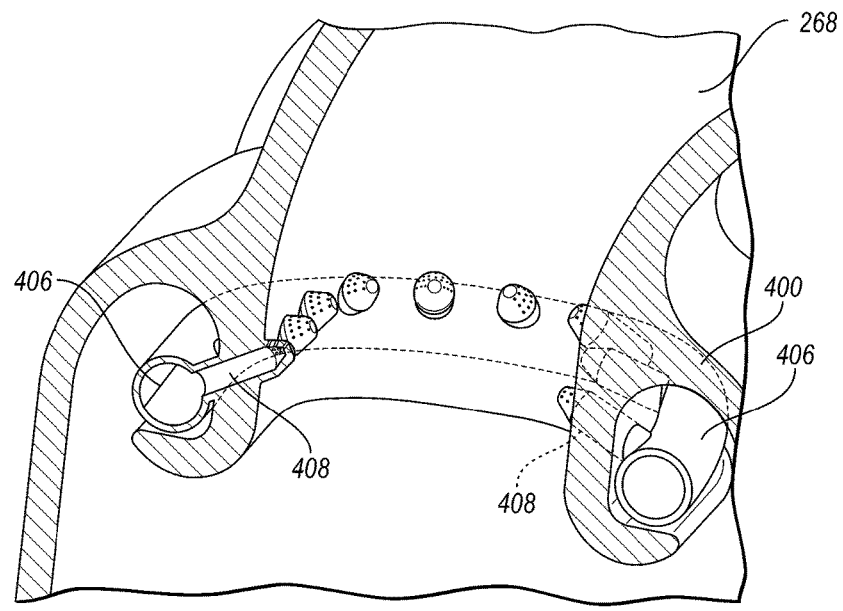

The branch 404 or wing 406 may include the nozzles 408 along its entire length or only along a portion of its length as is illustrated for example in FIGS. 12A and 12B. The nozzles 408 may be spaced evenly or unevenly along the length of the branch 404 or wing 406. For example, in a non-limiting example embodiment where the wing 406 at least partially surrounds the flange 282, the nozzles 408 may be located along the circumference of the flange 282.

The nozzle 408 may have a body 416 and a tip 418. The body 416 may be elongated. The dimensions of the body 416 may be uniform or non-uniform. For example, the body 416 may narrow or widen in the direction from the port 400, branch 404, wing 406 towards the interior of the intake manifold 238. The diameter of the nozzle 408 is wide enough to enable flow of the fluid from the port 400 to the interior of the intake manifold 238. The diameter of the nozzle 408 may be smaller than the diameter of the branch 404, the wing 406, or both. The diameter of the nozzle 408 may be one eight, one fourth, one half of the diameter of the branch 404, the wing 406, or both. Alternatively, the diameter of the nozzle 408 may be once, twice, three times, four times, five times, eight times, or ten times smaller than the diameter of the branch 404, the wing 406, or both.

Each nozzle 408 may have the same or different dimensions of the body 416. For example, nozzles 408 with a first diameter may alternate with nozzles 408 having a second diameter, the second diameter being different from the first diameter. The first diameter may be smaller or greater than the second diameter. A third, fourth, fifth diameter, each different from one another and from the first and second diameter are contemplated. Alternatively, nozzles 408 with the first diameter may be the most outer nozzles 408 while the nozzles 408 with the second diameter may be located between the most outer nozzles 408.

Figure 13:
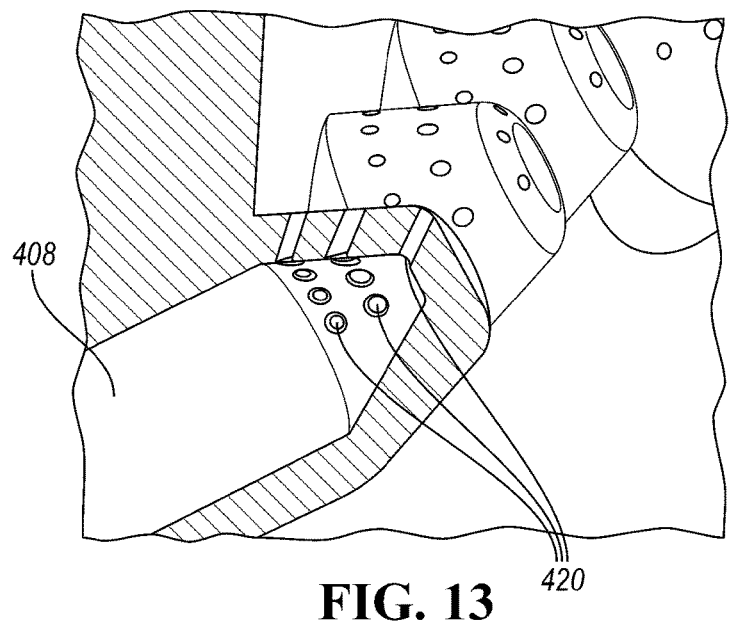
FIG. 13 shows a non-limiting example of nozzles protruding into the interior of the intake manifold with tips for fluid distribution.

The tip 418 of the nozzle 408 may extend into the cavity of the intake manifold 238, for example into the aperture 254, into the plenum opening, into an opening of one of the channels 256, or the like. The tip 418 may thus form a notch. The extension may encompass just the tip 418 and/or another portion of the nozzle 408. The tip 418 protruding into the internal space of the intake manifold 238 is depicted, for example, in FIGS. 12A, 12B, and FIG. 13. In an alternative embodiment, the tip 418 may be flush with an internal surface of the plenum 238, as is depicted in FIG. 14.

The location, purpose, angle, and other properties of the port 400 determine the shape of the nozzle 408, the tip 418, or both. For example, the tip 418 may have a shape of a cone, conical frustum, half-sphere or dome, be rounded or pointed. Other shapes are contemplated. The tip 418 may feature at least one aperture or opening 420. A number of openings 420 may be present, for example arranged in a portion of the tip 418, around the entire circumference of the tip 418, in rows, regularly, irregularly spaced apart from each other. As can be seen in a non-limiting example of FIG. 13, three rows of openings 420 are included on each tip 418, the openings 420 being present on a half of the tip 418 pointing towards the outlet of the runners 268. The rows may feature the same or different openings 420. For example, a first row may feature openings 420 with a smaller or greater diameter than the openings 420 in a second, and/or third row. The number of openings 420 in each row may be the same or different.

Figure 14:
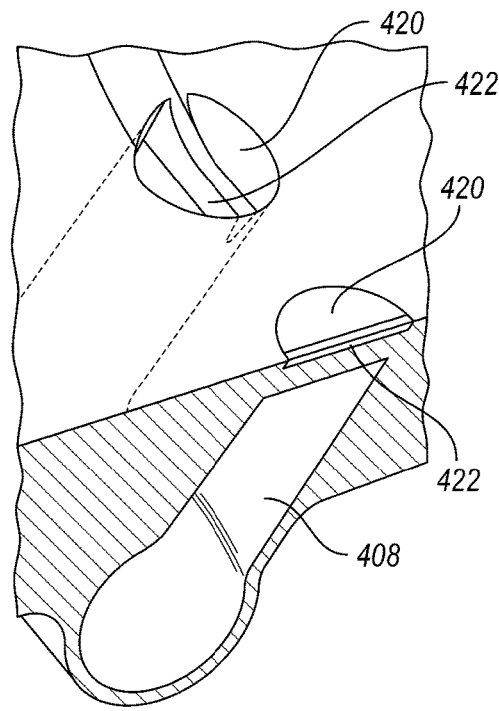
FIG. 14 shows a non-limiting example of nozzles with diverters.

In an alternative embodiment depicted in FIG. 14, the nozzle 408 may have a circular opening 420 flush with the inner surface of the intake manifold 238 and feature a number of diverters 422. The diverters 422 may be tapered or curved. The diverters 422 may be placed in a variety of locations. The function of the diverters 422 is to assist with directing the fluid in a specific direction, to help disperse the fluid onto desirable surfaces or avoid spraying the fluid onto surfaces which may be susceptible to high heat or other conditions caused by the fluid distribution into the intake manifold 238.

Besides diverters 422, the nozzle 408 and/or the tip 418 may include one or more filters (not depicted) to purify the fluid to be released into the intake manifold 238. Alternatively, one or more filters may be placed anywhere else within the port 400 such as in the inlet 402, branch 404, wing 406, or a combination thereof.

Figure 15A:
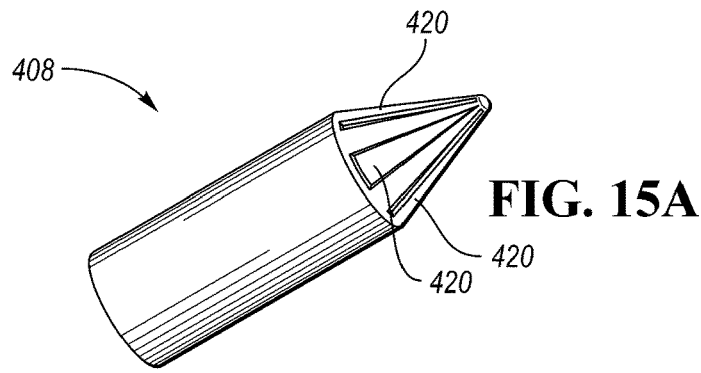
FIGS. 15A-15C show a yet alternative example embodiment of nozzles of the fluid distribution port discloses herein.
Figure 15B:
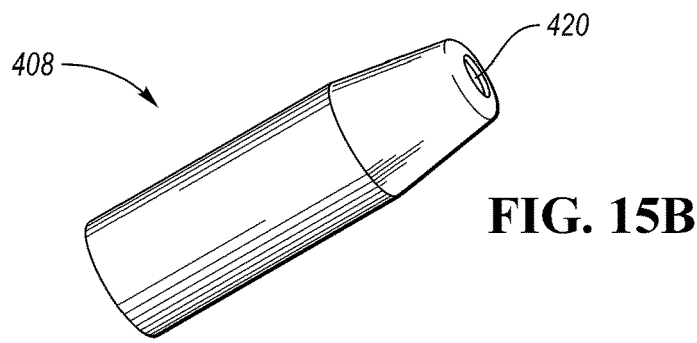
Figure 15C:
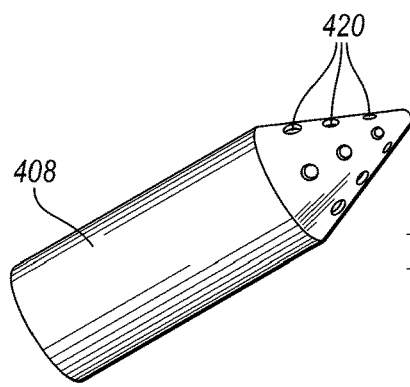

In yet alternative embodiments, depicted in FIGS. 15A-15C are a nozzle 408 having a tip 418 with elongated apertures 420, a nozzle 408 with a rounded tip 418 having a single aperture 418, and a nozzle having apertures 420 arranged around the entire circumference of the tip 418, respectively.

As was mentioned above, the fluid may be nitrous oxide such that the port 400 is configured as a nitrous oxide delivery apparatus or port connected to a supply or reservoir of nitrous oxide and adapted to increase an internal combustion engine's power output. Typical nitrous oxide delivery apparatuses are single point entry systems bolted to the intake manifold. The typical nitrous oxide delivery systems thus require a lot of mechanical fittings, feature flare style arrangements, which may be very complex, yet not enabling to include fine orifices or even a plurality of orifices. The port 400 designed as a nitrous oxide port enables fine, more even distribution of nitrous oxide without disruptions to the gas path normally caused by a single-point entry systems.

The port 400 may have yet different functions, for example serve as an EGR apparatus. The EGR apparatus 316 serves as a nitrogen oxide reduction apparatus, capable of recirculating a portion of engine exhaust gas back to the engine cylinders. The gas flowing through the intake manifold 238 is enriched with gases inert to combustion, acting as absorbents of combustion heat, which reduces peak temperatures in the cylinders.

The typical EGR inlet port is located within the gooseneck, downstream of the throttle body or in the vicinity of the throttle body adapter area. The port is typically machined, leaving a port with sharp edges. Thus, when the EGR system is active, exhaust gas is introduced into the gas flow in the intake manifold through a single location, which may cause disruption of the gas flow in the intake manifold. Additionally, due to the single point of entry, the mixing of the exhaust gas with the gas present inside of the gooseneck conduit 284 is minimal.

To improve mixing of the exhaust gas with the gas present inside of the intake manifold 283 as well as overall performance and engine efficiency, the EGR gas may be lead via the port 400 arranged as an EGR apparatus or exhaust gas recirculator configured to reduce NOx of the engine and capable of distributing NOx into the interior of the intake manifold 238. The exhaust gas recirculator designed as port 400 may be connected to an exhaust manifold with an exhaust flow, tube, or tubing, and a valve capable of releasing the exhaust gas.

Possible advantages of the port 400 configured as the exhaust gas recirculator may include better mixing of the gasses within the intake manifold 238, delivery of the exhaust gas closer to the combustion system, even dispersion of the exhaust gas which may contribute to and maintain a more stable combustion process, contribution to a better thermal control of the system, and protection of the throttle body in the gooseneck, susceptible to high heat, from exposure to high temperatures associated with reintroduction of the exhaust gas to the intake manifold 238. The port 400 configured as the EGR apparatus thus becomes a part of the cooling of the engine system.

Alternatively still, the port 400 may be configured as a condensate port configured to provide condensate from a heat exchanger such as a charge air cooler, capable of collecting condensate, to the engine. The connection between the heat exchanger and the port 400 may be via tubing, a tube, a conduit, the like, or a combination thereof. A control valve may be provided as well. A filter may be included in or prior to the port 400 to remove any undesirable contaminants from the condensate.

Figure 16:
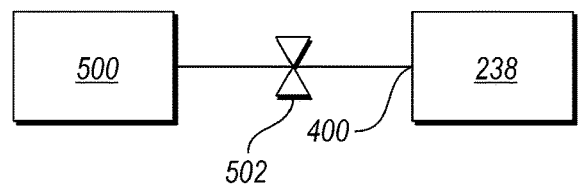
FIG. 16 schematically shows a connection between a supply of the fluid and the fluid distribution port.

FIG. 16 schematically shows connection of the intake manifold 238 via the port 400 to a supply of the fluid 500. The supply 500 may be a fluid reservoir, pool, collector, container, storage, a tank, a portion of the engine, a portion of the powertrain, an exhaust manifold, a heat exchanger, or another source. The supply may be continuous or discontinuous. The supply may be a one-time supply such as a one-time fluid addition which allows addition of the fluid from a container, which is not part of the automotive system, directly to the inlet 402. For example, a fluid may be provided from a container which may be discarded after the addition. The connection may be via tubing, flow, pipe, duct, line, hose, canal, channel, conduit, or the like. The connection may or may not include a valve 502, which may be a control valve allowing flow of the fluid from the supply 500 to the port 400 under a first set of circumstances and preventing flow of the fluid from the supply 500 to the port 400 under a second set of circumstances.

A method of forming the integral intake manifold 238 and the fluid delivery port 400 is also disclosed herein. The enabler for production of the disclosed intake manifold, having unique structural features depicted in the Figures and described above, may be additive manufacturing. Additive manufacturing processes relate to technologies that build 3-D objects by adding layer upon layer of material. The material may be plastic, metal, concrete, or the like. Additive manufacturing includes a number of technologies such as 3-D printing, rapid prototyping, direct manufacturing, layered manufacturing, additive fabrication, vat photopolymerization including stereolithography (SLA) and digital light processing (DLP), material jetting, binder jetting, material extrusion, powder bed fusion, sheet lamination, directed energy deposition, and the like.

Early additive manufacturing focused on pre-production visualization models, fabricating prototypes, and the like. The quality of the fabricated articles determines their use and vice versa. The early articles formed by additive manufacturing were generally not designed to withstand long-term use. The additive manufacturing equipment was also expensive, and the speed was a hindrance to a widespread use of additive manufacturing for high volume applications. But recently, additive manufacturing processes have become faster and less expensive. Additive manufacturing technologies have also improved regarding the quality of the fabricated articles.

Any additive manufacturing technique may be used to produce the disclosed integral intake manifold 238 and the port 400 as additive manufacturing technologies operate according to a similar principle. The method may include utilizing a computer, 3-D modeling software (Computer Aided Design or CAD), a machine capable of applying material to create the layered intake manifold, and the layering material. An example method may also include creating a virtual design of the intake manifold in a CAD file using a 3-D modeling program or with the use of a 3-D scanner which makes a 3-D digital copy of the intake manifold, for example from an already created intake manifold. The method may include slicing the digital file, with each slice containing data so that the intake manifold may be formed layer by layer. The method may include reading of every slice by a machine applying the layering material. The method may include adding successive layers of the layering material in liquid, powder, or sheet format, and forming the intake manifold while joining each layer with the next layer so that there are hardly any visually discernable signs of the discreetly applied layers. The layers form the three-dimensional solid intake manifold described above having a plenum housing with a gas inlet, the housing including a plurality of runners, each runner ending with an opening leading to a gas distribution channel having a gas outlet at its opposite end such that the additive manufacturing process forms a unitary integral piece. The method may also include forming additional features as integral parts of the intake manifold 238 by additive manufacturing, for example the gooseneck 284, the port 400 configured to provide a fluid to the intake manifold such as an exhaust gas recirculator, nitrous oxide port, an additive fluid port, a service fluid port, or a condensate port.

The additively manufactured intake manifold 238 with the port 400 may need to undergo one or more post-processing steps to yield the final 3-D object, for example stabilizing. Stabilizing relates to adjusting, modifying, enhancing, altering, securing, maintaining, preserving, balancing, or changing of one or more properties of the intake manifold formed by additive manufacturing such that the formed intake manifold meets predetermined standards post-manufacturing.

The stabilized intake manifold remains in compliance with various standards for several hours, days, weeks, months, years, and/or decades after manufacturing. The property to be altered may relate to physical, chemical, optical, and/or mechanical properties. The properties may include dimensional stability, functionality, durability, wear-resistance, fade-resistance, chemical-resistance, water-resistance, ultra-violet (UV)-resistance, thermal resistance, memory retention, desired gloss, color, mechanical properties such as toughness, strength, flexibility, extension, the like, or a combination thereof.

Additive manufacturing enables formation of intricate shapes, undulating shapes, smooth contours and gradual transitions between adjacent segments or parts of the unitary intake manifold, resulting in a more even intake gas distribution to the engine. For example, additive manufacturing enables formation of the intricate shapes of the branches 404, wings 406, connectors 410, nozzles 408, tips 418, and apertures 420. The intake manifold 238 and the port(s) 400 formed by the method described above may be free of any fasteners, adhesive, or other types of bonds typical for traditional intake manifold manufacturing.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A power train system comprising:
a heat exchanger reservoir to collect condensate;
a layered intake manifold; and
integral tubing leading from the reservoir to an interior of the intake manifold via an intake manifold wall such that there is no seal between a condensate port and the manifold, the tubing splitting into at least two branches transitioning into a set of wings containing a plurality of nozzles protruding into the interior.

2. A power train system of claim 1, wherein the wall is located in an intake manifold plenum.

3. A power train system of claim 1, wherein the tubing leads through a portion of the wall having the greatest thickness.

4. A power train system of claim 1, wherein the tubing leads to a portion of the intake manifold containing a channel gradually transitioning into a runner.

5. A power train system of claim 1, wherein each of the set of wings partially surrounds a runner.

6. A power train system of claim 1, wherein each of the plurality of nozzles protrudes into a runner cavity within the intake manifold.

7. A power train system of claim 1, wherein each of the plurality of nozzles comprises a tip having a plurality of apertures.

8. A condensate port arrangement comprising:
a series of layers defining an integrated intake manifold, and a condensate port including a tube transitioning from an exterior to an interior of the intake manifold while forming no seal between the condensate port and the manifold, the tube defining arms branching out into tubular curvatures, each having a plurality of nozzles to distribute condensate into the interior.

9. The condensate port arrangement of claim 8, wherein the tube at least partially surrounds the intake manifold.

10. The condensate port arrangement of claim 8, wherein the tube runs perpendicular to an intake manifold wall.

11. The condensate port arrangement of claim 8, wherein the plurality of nozzles protrudes through a bellmouth opening of an intake manifold runner.

12. The condensate port arrangement of claim 8, wherein a tip of each of the plurality of nozzles lies flush with an internal surface of the intake manifold.

13. The condensate port arrangement of claim 8, wherein each of the arms transitions into the tubular curvature via a symmetrical connector.

14. The condensate port arrangement of claim 13, wherein the connector is located at an extended distance from an end portion of the tubular curvature.

15. An engine component comprising:
a stratified intake manifold; and
a stratified duct forming a condensate port configured to provide condensate from a heat exchanger to the engine, the duct including an inlet located outside of the intake manifold and transitioning into an interior of the intake manifold such that there is no seal between the recirculator and the manifold, the duct splitting into wings surrounding runner flanges and containing at least two nozzles each, and the nozzles protruding via the flanges into runner cavities.

16. The engine component of claim 15, wherein each of the nozzles includes a tip having at least one aperture.

17. The engine component of claim 15, wherein each of the nozzles includes a plurality of apertures arranged in one or more rows.

18. The engine component of claim 17, wherein each of the rows includes apertures with a different diameter.

19. The engine component of claim 15, wherein at least one of the nozzles defines a plurality of apertures configured to spray the condensate.

20. The engine component of claim 15, wherein the nozzles protrude via the flanges in a direction towards runner outlets.

* * * * *